United States Patent
Costa et al.

(10) Patent No.: US 11,483,192 B2
(45) Date of Patent: Oct. 25, 2022

(54) METHOD, DEVICES AND COMPUTER PROGRAM FOR MOBILE DEVICE POSITIONING IN A WIRELESS NETWORK

(71) Applicant: HUAWEI TECHNOLOGIES CO., LTD., Guangdong (CN)

(72) Inventors: Mario Costa, Helsinki (FI); Petteri Kela, Kista (SE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/995,132

(22) Filed: Aug. 17, 2020

(65) Prior Publication Data

US 2020/0382356 A1 Dec. 3, 2020

Related U.S. Application Data (63) Continuation of application No. PCT/EP2018/054016, filed on Feb. 19, 2018.

(51) Int. Cl.
*H04L 27/26* (2006.01)
*H04L 25/02* (2006.01)
*H04W 64/00* (2009.01)

(52) U.S. Cl.
CPC ........ *H04L 27/2647* (2013.01); *H04L 25/022* (2013.01); *H04L 25/0204* (2013.01); *H04W 64/003* (2013.01)

(58) Field of Classification Search
CPC ............. H04L 27/2647; H04L 25/0204; H04L 25/022; H04W 64/003

(Continued)

(56) References Cited

U.S. PATENT DOCUMENTS 6,266,528 B1 * 7/2001 Farzaneh ............. H04B 17/318
455/67.11
6,889,053 B1 * 5/2005 Chang ................... G01S 5/0278
342/357.29

(Continued)

FOREIGN PATENT DOCUMENTS

CN 101091400 A 12/2007
CN 104812061 A 7/2015

(Continued)

OTHER PUBLICATIONS

David Tse et al., "Fundamentals of Wireless Communication", Cambridge University Press, 2005, pp. 61-64 (71 pages).

(Continued)

*Primary Examiner* — Wednel Cadeau
(74) *Attorney, Agent, or Firm* — WHDA, LLP (57) ABSTRACT

Device, method and computer program to make better use of measurements of received signals for determining location are provided. A client device is configured to receive a signal that contains a reference symbol modulated onto a plurality of subcarriers. The client device determines a plurality of weights based on the reference symbol and line-of-sight channel frequency responses for the subcarriers, so that each of the plurality of weights is associated with one of the subcarriers. The client device determines a gain associated with the received signal using the plurality of weights. A network device may receive from the client device information indicative of gains, wherein a gain indicates a signal strength at which the client device was able to receive a respective signal. The location of the client device may be determined by using information about network device locations, transmission directions, and the gains.

10 Claims, 5 Drawing Sheets

(58) Field of Classification Search
USPC .......................................................... 375/260
See application file for complete search history.

(56) References Cited

U.S. PATENT DOCUMENTS

| | | | |
|---|---|---|---|
| 7,200,127 B1* | 4/2007 | Lee | G01S 11/04 370/320 |
| 2006/0089154 A1* | 4/2006 | Laroia | H04B 17/27 455/456.2 |
| 2015/0133173 A1 | 5/2015 | Edge et al. | |
| 2016/0255604 A1* | 9/2016 | Venkatraman | G01S 5/0252 455/456.1 |
| 2017/0366244 A1 | 12/2017 | Lee et al. | |
| 2017/0374637 A1 | 12/2017 | Akkarakaran et al. | |
| 2018/0035256 A1 | 2/2018 | Prevatt | |
| 2019/0379431 A1 | 12/2019 | Park et al. | |

FOREIGN PATENT DOCUMENTS

| | | | |
|---|---|---|---|
| CN | 107347210 A | 11/2017 | |
| EP | 2709290 A2 * | 3/2014 | ............... H04B 7/02 |
| WO | 2006044291 A2 | 4/2006 | |
| WO | 2015027118 A1 | 2/2015 | |
| WO | 2016099079 A1 | 6/2016 | |

OTHER PUBLICATIONS

Huawei et al., "Beam measurement and reporting", 3GPP TSG RAN WG1 Meeting #90bis R1-1717301, Prague, Czech Republic, Oct. 9-13, 2017 (7 pages).

ZTE et al., "Details and evaluation results on beam reporting", 3GPP TSG RAN WG1 Meeting #90-bis R1-1717428, Prague, Czechia, Oct. 9-13, 2017 (14 pages).

Samsung, "On Beam Management, Measurement and Reporting", 3GPP TSG RAN WG1 Meeting 90bis R1-1717605, Prague, CZ, Oct. 9-13, 2017 (16 pages).

NTT DOCOMO, "Performance investigation on beam reporting", 3GPP TSG RAN WG1 Meeting #90b R1-1718196, Prague, CZ, Oct. 9-13, 2017 (5 pages).

Nokia et al., "Beam Indication, Measurements and Reporting", 3GPP TSG RAN WG1 Meeting #90bis R1-1718511, Prague, Czech Republic, Oct. 9-13, 2017 (12 pages).

International Search Report dated Oct. 25, 2018, issued in counterpart Application No. PCT/EP2018/054016 (17 pages).

* cited by examiner

METHOD, DEVICES AND COMPUTER PROGRAM FOR MOBILE DEVICE POSITIONING IN A WIRELESS NETWORK

CROSS-REFERENCE TO RELATED APPLICATIONS

This application is a continuation of International Application No. PCT/EP2018/054016, filed on Feb. 19, 2018, the disclosure of which is hereby incorporated by reference in its entirety.

TECHNICAL FIELD

The invention relates to the field of wireless network communications, and particularly to the use of directional measurements of signals for locating a client device. Furthermore, the invention relates to corresponding methods and a computer program.

BACKGROUND

In advanced wireless radio communications, such as the fifth generation, 5G, system, one central base station, gNodeB, may be controlling several transmission or reception points, TRPs. Each gNodeB or TRP may form several spatial beams which are used for transmitting or receiving data to or from several user equipment, UEs, simultaneously using a certain time, frequency and code. The UEs can also be called client devices, user nodes, user devices, mobile terminals, mobile devices, or mobile nodes. The gNodeBs and TRPs may also be called network nodes, fixed nodes, or network devices. The term network node or network device also includes but is not limited to a base station, a Node-B or eNode-B, an access node (ANd), a base station controller, an aggregation point or any other type of interfacing device in a communication environment.

Also, the UEs may have the capability of directional transmission and reception, i.e. beam forming. A UE that has such capability forms its beams by using sophisticated hardware and advanced signal processing, for example by tuning the relative phasing of signals going through different antenna elements.

Making the transmissions directional may make it possible to use beam-specific measurements for positioning, i.e. for finding out the momentary location of a UE. The TRPs may transmit reference signals or some other transmissions that have a regular, predefined form through different beams, and the UE may measure the quality of the beam-specific transmissions it can receive. Evaluating the beam-specific reception quality, and knowing the actual directions to which said beams pointed at the TRP, may enable calculating the direction in which the UE is currently located in relation to the TRP. However, the known methods have shown to be relatively inaccurate, in particular if the number of beams that the UE can measure and report is small.

SUMMARY

It is an object of the invention to provide a client device and a network node that are capable of utilizing the measurements of received signals for determining the location of a client device. Another object of the invention is to improve the accuracy of such location determining with respect to the previously known methods. It is also an object of the invention to provide methods for execution of the client device and network nodes that enable determining the location of the client device by making measurements of the received signals.

The foregoing and other objects are achieved by the features of the independent claims. Further implementation forms are apparent from the dependent claims, the description, and the figures.

According to a first aspect, a client device is provided. The client device is configured to receive a signal that contains a reference symbol modulated onto a plurality of subcarriers. The client device is also configured to determine a plurality of weights based on the reference symbol and line-of-sight channel frequency responses for the subcarriers, wherein each of said plurality of weights is associated with one of said subcarriers. The client device is further configured to determine a gain associated with said received signal using said plurality of weights.

In a first possible implementation form of the client device according to the first aspect, the client device is configured to transmit information indicative of said determined gain to a network node of said wireless network. This involves the advantage that the location of the client device can be determined using the processing capacity of one or more network devices in the wireless network.

In a second possible implementation form of the first aspect, the client device is configured to use said determined gain in said client device to determine a location of the client device. This involves the advantage that a client device may determine its own location very quickly and without having to rely upon external resources other than beamformed transmissions of the network nodes.

In a third possible implementation form of the first aspect, the client device is configured to determine said gain as a real part of a weighted sum of complex vectors, each of said complex vectors representing a corresponding part of said received signal on a corresponding one of said plurality of subcarriers. This involves the advantage that the true contribution of each of the subcarriers can be utilized in the calculation.

In a fourth possible implementation form of the first aspect, the client device is configured to determine a reliability of said determined gain, and transmit said information indicative of said determined gain to said network node only if said determined reliability is better than a predetermined threshold. This involves the advantage that the introduction of errors to the determination of location is decreased, because unreliable information can be excluded from the calculations.

In a fifth possible implementation form of the first aspect, the client device is configured to determine a first Bayesian information criterion indicative of a likelihood of the received signal containing signal and noise, and determine a second Bayesian information criterion indicative of a likelihood of the received signal containing only noise; so that said determined reliability being better than said predetermined threshold means that said first Bayesian information criterion is smaller than said second Bayesian information criterion. This involves the advantage that a robust and well-defined method can be applied in determining the reliability.

In a sixth possible implementation form of the first aspect, the client device is configured to determine a reliability value indicative of a reliability of said determined gain, and transmit said information indicative of said determined gain and said determined reliability value to said network node. This involves the advantage that the reliability determined by the client device can be taken into account also in the calculations performed in the network devices.

In a seventh possible implementation form of the first aspect, said reliability value comprises at least one of: a variance of said determined gain, a Fisher information of said determined gain. This involves the advantage that well-defined methods can be used for determining the reliability value.

In an eighth possible implementation form of the first aspect, the client device is configured to receive said signal through a plurality of reception beams, and select one of said plurality of reception beams, so that only the signal received through the selected reception beam is used for said determining of said plurality of weights. This involves the advantage that the determination of gains for different received beams can be balanced.

In a ninth possible implementation form of the first aspect, the client device is configured to perform said selecting of one of said plurality of reception beams by applying one of the following criteria: selecting the reception beam that yields the largest sum of gains of all received signals; selecting the reception beam that yields the highest gain of an individual received signal; selecting the reception beam that yields the largest sum of determined reliabilities of determined gains; selecting the reception beam that gives the highest reliability of a determined gain of an individual received signal. This involves the advantage that a well-understood physical basis can be given for the selection, which enables making a good selection.

According to a second aspect, a network device is provided. The network device is configured to receive from a client device information indicative of gains, wherein a gain indicates a signal strength at which the client device was able to receive a respective signal. The network device is also configured to receive from the client device reliability values, wherein a reliability value indicates how reliably the client device was able to determine a respective gain. The network device is also configured to determine a location of the client device by using information about: locations of network nodes that transmitted signals to the client device; directions to which said network nodes transmitted said signals; said gains; and said reliability values.

In a first possible implementation form of the network device according to the second aspect the network device is configured to transmit to the client device instructions of determining reliability of gains that said client device determines for the signals it receives. This involves the advantage that the wireless network can maintain good control of the actions that the client devices should perform related to the determination of their locations.

According to a third aspect, there is provided method that a client device can execute. The method comprises receiving a signal that contains a reference symbol modulated onto a plurality of subcarriers; determining a plurality of weights based on the reference symbol and line-of-sight channel frequency responses for the subcarriers, wherein each of said plurality of weights is associated with one of said subcarriers; and determining a gain associated with said received signal using said plurality of weights.

According to a fourth aspect, there is provided a method that a network device can execute. The method comprises receiving from a client device information indicative of gains, wherein a gain indicates a signal strength at which the client device was able to receive a respective signal; receiving from the client device reliability values, wherein a reliability value indicates how reliably the client device was able to determine a respective gain; and determining a location of the client device by using information about locations of network nodes that transmitted signals to the client device, directions to which said network nodes transmitted said signals, said gains, and said reliability values.

According to a fifth aspect, there is provided a computer program comprising one or more series of one or more computer executable instructions that, when executed by one or more processors, are configured to cause the performing of at least one method of the kind described above. The computer program can be stored or embodied on a volatile or non-volatile computer-readable non-transitory record medium in the form of program code.

These and other aspects of the invention will be apparent from the enclosed figures and the embodiments described below.

DETAILED DESCRIPTION

Figure 1:
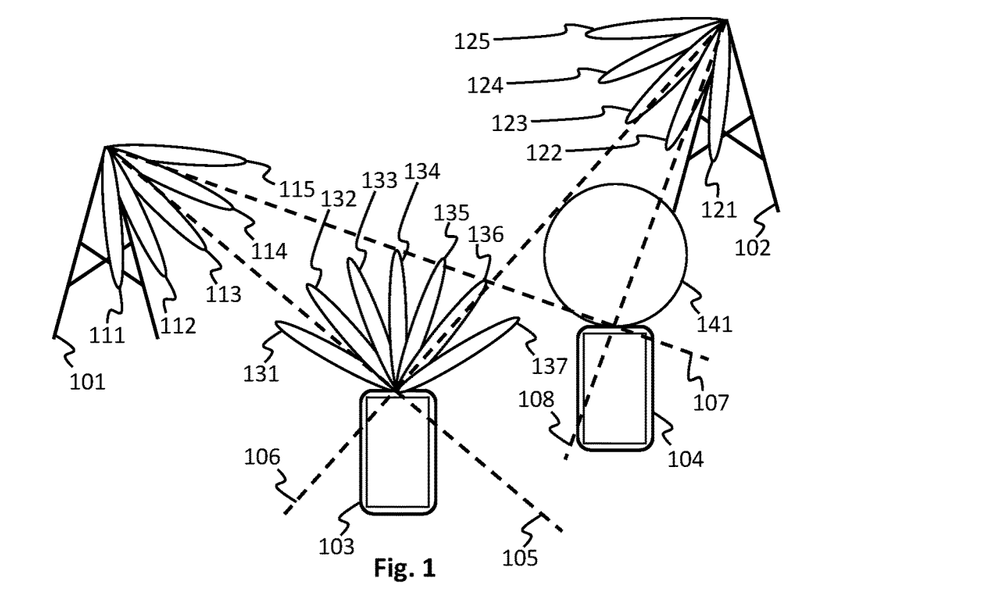
FIG. 1 illustrates some network nodes and some client devices.

FIG. 1 illustrates a first network node 101, a second network node 102, a first client device 103, and a second client device 104 of a wireless network. The first and second network nodes 101 and 102 are illustrated as base stations or TRPs; the name or designation used is not important. As network nodes, they are capable of physically transmitting and receiving wireless signals. A feature of the wireless network is its capability of establishing wireless communications to and from the client devices 103 and 104. Additionally, in FIG. 1, the wireless network has the capability of determining locations of client devices. This capability takes advantage of the use of transmission beams, and may involve also some utilization of the reception beams.

The first network node 101 is capable of setting up and maintaining five transmission beams 111, 112, 113, 114, and 115. The second network node 102 is capable of setting up and maintaining five transmission beams 121, 122, 123, 124, and 125. This number of beams is used here only as an example, and any of the network nodes could be capable of setting up and maintaining more or fewer beams. Also, in FIG. 1 the beams are drawn as covering only a limited sector of directions from the respective network node, while in reality a network node may be capable of setting up and maintaining transmission beams into a large variety of directions. For the purposes of the following description it is immaterial whether the directions of the beams are defined in two dimensions, i.e. in a horizontal plane, or whether they are defined in three dimensions. A network node (and/or another network node that is controlling the operation of the network node that physically sets up and maintains the transmission beams) knows the physical direction into which each beam is pointing.

The first client device 103 is capable of setting up and maintaining a total of seven beams 131 to 137. The second client device 104 does not have the capability of beamforming so its transmission and reception pattern 141 is shown to be omnidirectional. These are also just examples, and there may be client devices in the wireless network that are capable of setting up and maintaining more or fewer beams than seven. The number of transmission beams and reception beams does not need to be the same. It is also possible that a client device adapts its beamforming capability dynamically, so that under some first circumstances it uses an omnidirectional pattern like that of the second client device 104 in FIG. 1, and under some second circumstances it uses two or more beams.

The determination of a location of a client device may be based on directions in various ways. Determining even a single direction may be sufficient, if there is some other information available, like the height from sea level of the client device. Two directions from network nodes can be used for purely angular measurements. As an example, the first client device 103 is in a direction 105 with relation to the first network node 101 and in a direction 106 with relation to the second network node 102. The second client device 104 is in a direction 107 with relation to the first network node 101 and in a direction 108 with relation to the second network node 102. If these directions can be determined with reasonable accuracy, the location of the corresponding client device can be determined as the intersection of the imaginary lines drawn from these network nodes into these directions.

The directions 105, 106, 107, and 108 can be determined by making the client devices 103 and 104 receive transmissions of some known kind that the network nodes 101 and 102 make through their transmission beams. In the example of FIG. 1, if the first network node 101 transmits through all beams 111 to 115, the first client device 103 should observe the best reception quality (for example: strongest received signal) for those transmissions that were made through beam 113, followed by the transmissions that were made through beams 114 and 112 in this order. If the transmissions carried some kind of beam identification, the client device 103 is capable of recognizing the beams the transmissions of which it received, and calculate the beam-specific reception quality. If the physical directions of beams 112, 113, and 114 are known, the direction 105 can be calculated.

In the example of FIG. 1, the first client device 103 has a number of reception beams 131 to 137. It may measure the reception quality for a total of 35 transmission beam—reception beam pairs: transmissions made through beam 111 received through beam 131, transmissions made through beam 111 received through beam 132, and so forth. The second client device 104 does not have beam forming capability, so it can only measure the reception quality for the various transmission beams, the transmissions of which it can receive.

On its way from a transmitting station to a receiving station, the wireless signal goes through a transmission channel, the effect of which on the signal can be characterized with a line-of-sight channel frequency response. If the transmission contains symbols modulated onto subcarriers of different frequencies, like an OFDM (orthogonal frequency division modulation) transmission for example, the frequency response of the channel is not the same for all subcarriers. In other words, the different subcarriers experience different amounts of fading and phase shift on their way from the transmitting station to the receiving station.

Consider a case where the first network node 101 transmits a signal that contains a reference symbol (or, in a more general case: one or more reference symbols) modulated onto a plurality of subcarriers. Any of the first 103 and second 104 client devices may receive said signal, and determine a gain indicative of strength of the received signal. Any of the first 103 and second 104 client devices may transmit information indicative of the determined gain to the first network node 101 or some other network node of the wireless network that handles information related to positioning of the client devices. If the signal contained a transmission beam identifier, or if the receiving client device was otherwise capable of recognizing the transmission beam through which the transmission was made, said information may be transmission beam specific. If, however, the gain is calculated as a linear average of the received subcarriers, the calculated gain may be an inaccurate descriptor of the actual reception quality. In other words, the information that the client device transmits may give inaccurate information about how well (in relation to the signals transmitted through other beams) the signal was actually received at the respective client device.

The situation can be made more advantageous by configuring the client devices to determine a plurality of weights based on the reference symbol(s) and line-of-sight channel frequency responses for the subcarriers. Each of said plurality of weights is associated with one of said subcarriers. The client device may determine the gain associated with a received signal using said plurality of weights. The determined gain can then be used in determining a location of the client device. The client device may determine said gain for example as a weighted combination of received subcarriers. In such a case, the client device may be configured to calculate the weights used to produce said weighted combination from estimated, subcarrier specific frequency responses of the channel through which the signal was received.

Figure 2:
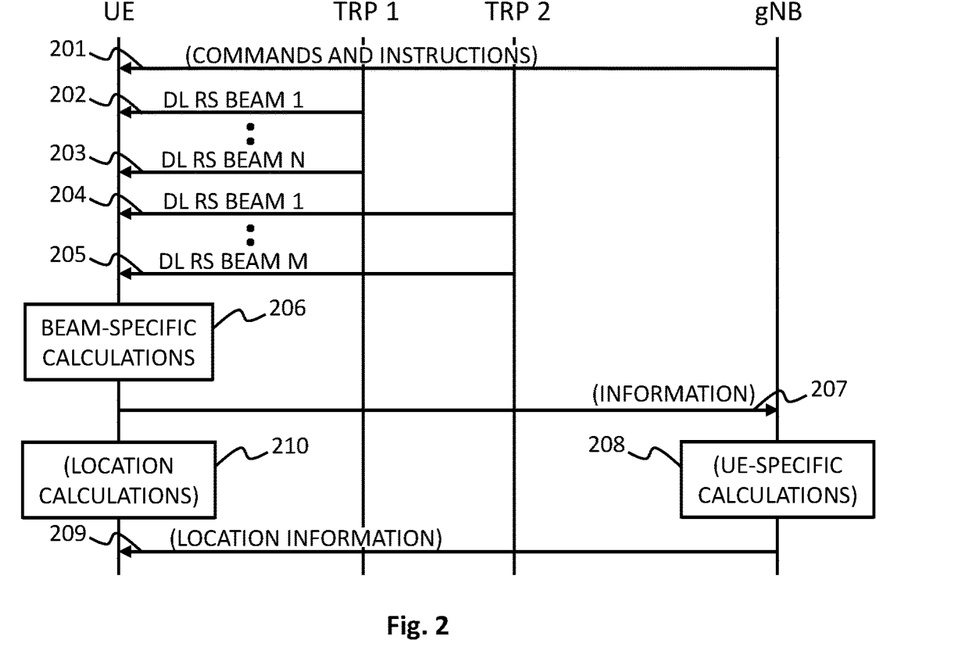
FIG. 2 illustrates actions of certain network nodes and a client device.

FIG. 2 illustrates some communications between three network nodes and a client device, and some other actions. The network node on the far right is called a gNB in FIG. 2, and it may be for example a central base station or other kind of network node that is capable of performing calculations related to the positioning of client devices. The two other network nodes are called TRP1 and TRP2 in FIG. 2, and they may be for example transmission and reception points controlled by the central base station. The client device is called UE in FIG. 2, and it may be for example a portable electronic device capable of setting up and maintaining wireless communications with network nodes of the wireless network.

Step 201 is possible but not obligatory, and it may comprise transmitting some commands and/or instructions to the client device, concerning actions that the client device should perform. The network device from which these instructions originate may be the gNB, and the transmission may go through one or both of the TRPs. Transmissions of this kind may also originate from one or both of the TRPs. The transmission at step 201 may comprise for example instructions of determining the gains for the signals that the client device receives. The transmission at step 201 may also comprise instructions of determining the reliability of gains that the client device determines. The concept of reliability in this respect will be discussed in more detail later in this text.

At steps 202 to 205, the client device receives signals, each of which contains one or more reference symbols modulated onto a plurality of subcarriers. In FIG. 2, it is assumed that the network node marked as TRP1 is capable of transmitting such signals through N beams, where N is an integer larger than 1. It is also assumed that the network node marked as TRP2 is capable of transmitting such signals through M beams, where M is an integer larger than 1. The transmissions are marked as DL RS transmissions in FIG. 2, which means downlink reference symbol transmissions.

The DL RS transmissions are shown in FIG. 2 as taking place in a temporal order: they begin with the transmission through beam 1 of TRP1, and proceed through the transmissions through each beam of TRP1 until the transmission through beam N of TRP1. Thereafter a similar sequence of transmissions is shown beginning with the transmission through beam 1 of TRP2 and ending with the transmission through beam M of TRP2. This order is selected in FIG. 2 only as an example, and for reasons of graphical clarity. The invention does not limit the number of transmissions that are made, or the order in which such transmissions are made. Transmissions can take place also simultaneously. The invention does not limit the number of TRPs or other network nodes through which transmissions of this kind are made.

At step 206, the client device makes beam-specific calculations. This means that the client device analyzes the signals it has received. It aims to determine the relative strengths of signals it has received. It should also identify which transmission beam of the network nodes is associated with each determined signal strength.

When the client device analyzes a received signal at step 206, it determines a plurality of weights based on the reference symbol(s) and line-of sight channel frequency responses for the subcarriers of that signal. Each of said plurality of weights is associated with one of the subcarriers. The client device also determines a gain associated with said received signal at step 206, using said plurality of weights.

There are a number of alternatives concerning what may happen after step 206. According to one alternative, the client device transmits information indicative of the determined gain to a network node of the wireless network at step 207. In other words, according to this alternative, the network device (here: the gNB) receives from the client device information indicative of gains, wherein a gain indicates a signal strength at which the client device was able to receive a respective signal. The network device may determine a location of the client device at step 208. In determining said location the network device may use information about locations of the network nodes (the TRPs) that transmitted signals to the client device, and information about directions to which said network nodes transmitted said signals. Additionally, the network device may use the information indicative of the gains it received at step 207.

According to another alternative, the client device transmits—at step 207—to the network device also reliability values, wherein a reliability value indicates how reliably the client device was able to determine a respective gain. In such a case, the network device may use—at step 208—also said reliability values when it determines a location of the client device.

If the network device determines the location of the client device at step 208, it may transmit location information to the client device at step 209. In other words, the information transmitted at step 209 may tell the client device its current location. Additionally or alternatively, the information transmitted at step 209 may relate otherwise to the location of the client device. For example, if the network device has found out that the current location of the client device is advantageously close to a shop, restaurant, or other commercial installation of which the user of the client device might be interested, the information transmitted at step 209 may comprise commercial information about such an installation.

Another alternative of what may happen after step 206 is illustrated as step 210 in FIG. 2. According to this alternative, the client device is configured to perform location calculations by itself. The client device may use the gain it determined at step 206 in itself to determine its location. For this it would need information about the locations of the network devices, the transmissions of which it received at steps 202 to 205. Additionally, the client device would need information about the directions of the respective transmission beams of the network nodes. The client device may have received this kind of information for example at step 201, or at some other step in which it receives basic information about the wireless network.

Figure 3:
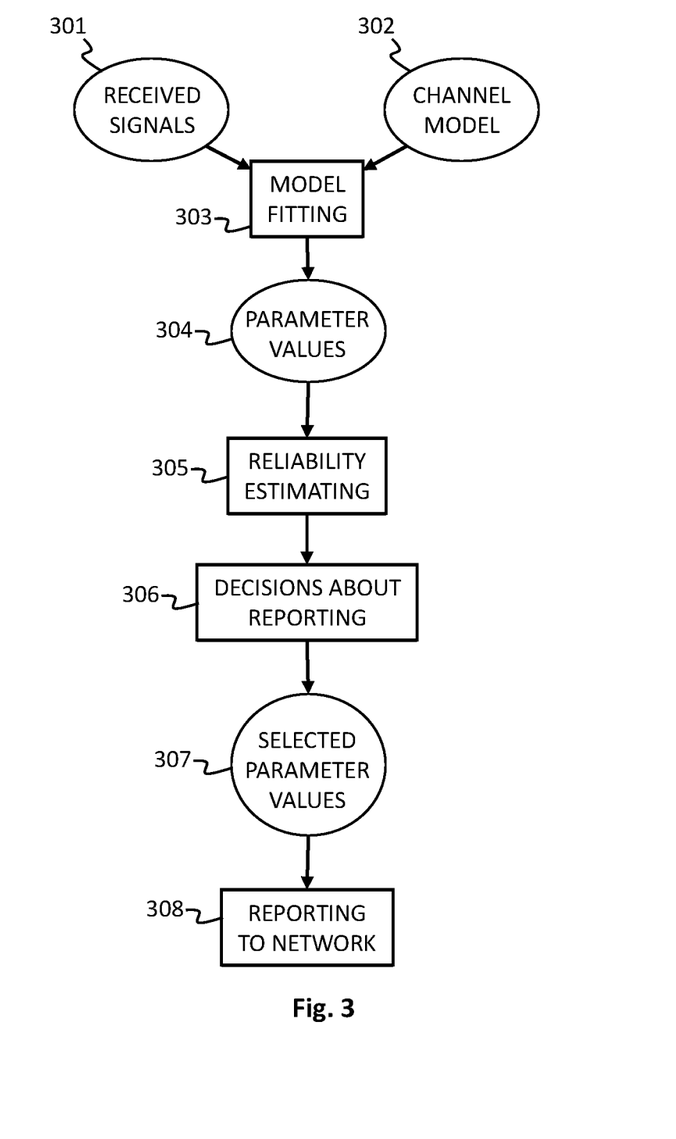
FIG. 3 illustrates a method for a client device.

FIG. 3 illustrates an example of a method that the client device may execute. Input information to the method are the received signals 301, and a parameterized mathematical model 302 of the transmission channel through which the signals propagate from the transmitting network nodes to the receiver within the client device. These are used to perform the so-called model fitting at step 303, which means that for the received signal the client device finds the set of parameter values 304 that would yield the best explanation of the actual received form for all subcarriers.

Finding such parameter values may be referred to as channel estimating, and the found parameter values may be called estimated parameter values. Examples of parameter values include but are not limited to an estimated gain, an estimated correction phase, an estimated measurement noise variance, and an estimated propagation delay.

As an example, the client device may be configured determine a beam-specific gain as a real part of a weighted sum of complex vectors, each of said complex vectors representing a corresponding part of the received (beam-specific) signal on a corresponding one of the plurality of subcarriers. According to a more exact mathematical formulation, the client device may be configured to calculate an estimated beam-specific gain $\hat{r}$ of a received signal according to $$\hat{r} = \text{Re}\{\Sigma y_f^* w_f\}$$

wherein:

$y_f^*$ is a complex conjugate of the f:th received subcarrier, $w_f$ is a weight applied to the f:th received subcarrier, $\vec{w} = [w_1, w_2, \ldots, w_f]$ is a vector of all weights applied to the 1st to f:th received subcarriers, $w = \tilde{b}_f(\hat{\tau}) e^{j\hat{\phi}} / \Sigma |\tilde{b}_f(\hat{\tau})|^2$, $\tilde{b}_f(\tau) = s b_f(\tau)$, S is a diagonal matrix containing the reference signals modulating each subcarrier, $b_f(\tau) = [e^{-j2\pi(M_f-1)/2 f_0 \tau}, \ldots, 1, \ldots, e^{j2\pi(M_f-1)/2 f_0 \tau}]^T$ is a frequency response of a line-of-sight channel corresponding to all subcarriers, $\hat{\phi} = \tan^{-1} \text{Im}\{y^H \tilde{b}_f(\hat{\tau})\} / \text{Re}\{y^H \tilde{b}_f(\hat{\tau})\}$ is a correction phase, $\hat{\tau} = \arg\max_\tau \tilde{b}_f(\tau)^H R_y \tilde{b}_f(\tau) / \|\tilde{b}_f(\tau)\|^2$ is a propagation delay, and $R_y = y y^H$ is a covariance matrix of the received subcarriers.

As illustrated by step 305, the client device may be additionally configured to determine a reliability of an estimated gain that is one of the parameter values 304. One way of determining a reliability is to utilize the so-called Fisher information, which is essentially a measure of how sharply the likelihood function peaks at the selected set of parameter values. A sharp peak in the likelihood function indicates higher reliability than a more smoothly curved hill.

The client device may be configured to calculate a measurement noise variance as $$\hat{\sigma}^2 = 1/M_f tr\{1 - \overline{b}_f(\hat{\tau})\overline{b}_f(\hat{\tau})^* R_y\},$$

where 'tr' means the sum of the diagonal elements of a matrix, and $M_f$ is the number of subcarriers. The client device may then be configured to determine a Fisher information matrix of $\Theta = [\hat{r}, \hat{\phi}, \hat{\sigma}^2, \hat{\tau}]$ by finding the gradient of a log-likelihood function given by:

$$l(\Theta|y) = -M_f \ln \pi - M_f \ln \sigma^2 - 1/\sigma^2 \|y - \overline{b}_f(\tau)\gamma\|^2$$

where $\gamma(\gamma = re^{j\phi})$, and taking the outer-product of the so-obtained gradient, followed by finding an expected value of the resulting matrix.

As illustrated by step 306 in FIG. 3, the client device may make decisions about what information it should transmit to the wireless network, based on the reliability of the determined beam-specific gain(s). It may decide to transmit information indicative of a determined gain to the wireless network only if the determined reliability of that determined gain is better than a predetermined threshold. This involves the advantage that the overall quality of information that the wireless network receives from the client device becomes better, so that the wireless network may avoid taking unreliable input information to the calculations where it determines the location of the client device. The selected information is shown as the selected parameter values 307 in FIG. 3, and their transmissions is shown as the reporting to network step 308.

As an example of the decisions at step 306, the client device may be configured to determine a first Bayesian information criterion indicative of a likelihood of the received signal containing signal and noise, and determine a second Bayesian information criterion indicative of a likelihood of the received signal containing only noise. In such a case, said determined reliability being better than said predetermined threshold means that said first Bayesian information criterion is smaller than said second Bayesian information criterion. The first Bayesian information criterion can be determined as $$2l(\hat{\Theta}|\gamma) + 4 \ln M_f$$

and the second Bayesian information criterion can be determined as $$-2l(\hat{\sigma}^2|\gamma) + \ln M_f.$$

As an addition or alternative to making a decision of this kind (select or not select a particular determined gain to be transmitted to the wireless network, based on the determined reliability of that particular gain), the client device may transmit actual information about the determined reliability to the wireless network. This is particularly advantageous when the client device is configured to determine the reliability as a numerical reliability value. Such a reliability value may comprise for example a variance of the determined gain, and/or a Fisher information of the determined gain.

In the description above the actions of the client device have been described mostly with reference to one signal that a network node of the wireless network transmitted through one beam. For generality, the actions of the client device can be described so that it is configured to receive a plurality of signals, each containing one or more reference symbols modulated onto a plurality of subcarriers, for each of said received signals, determine a plurality of weights based on the reference symbols contained in that signal and also based on line-of-sight channel frequency responses for the subcarriers of that signal, wherein each of said plurality of weights is associated with one of said subcarriers, and determine gains associated with each of said received signals using the respective plurality of weights, for use in determining a location of the client device.

Assuming that the location of the client device is to be determined on the network side, the client device may be configured to transmit to a network node a plurality of the determined gains, along with an indication that associates each of such determined gains with a corresponding received signal, for enabling said wireless network to determine said location of the client device. The client device may be configured to select the determined gains to be transmitted based on determined reliabilities of the determined gains, so that only those determined gains, that correspond to determined reliabilities that are better than a predetermined threshold, are transmitted.

The client device may be configured to determine respective reliability values, each of them indicative of a respective reliability of a respective one of said determined gains. The client device may be configured to transmit also the respective reliability values, along with an indication that associates a gain and a reliability value with a corresponding signal (i.e., beam) that the client device received to said network node.

Figure 4:
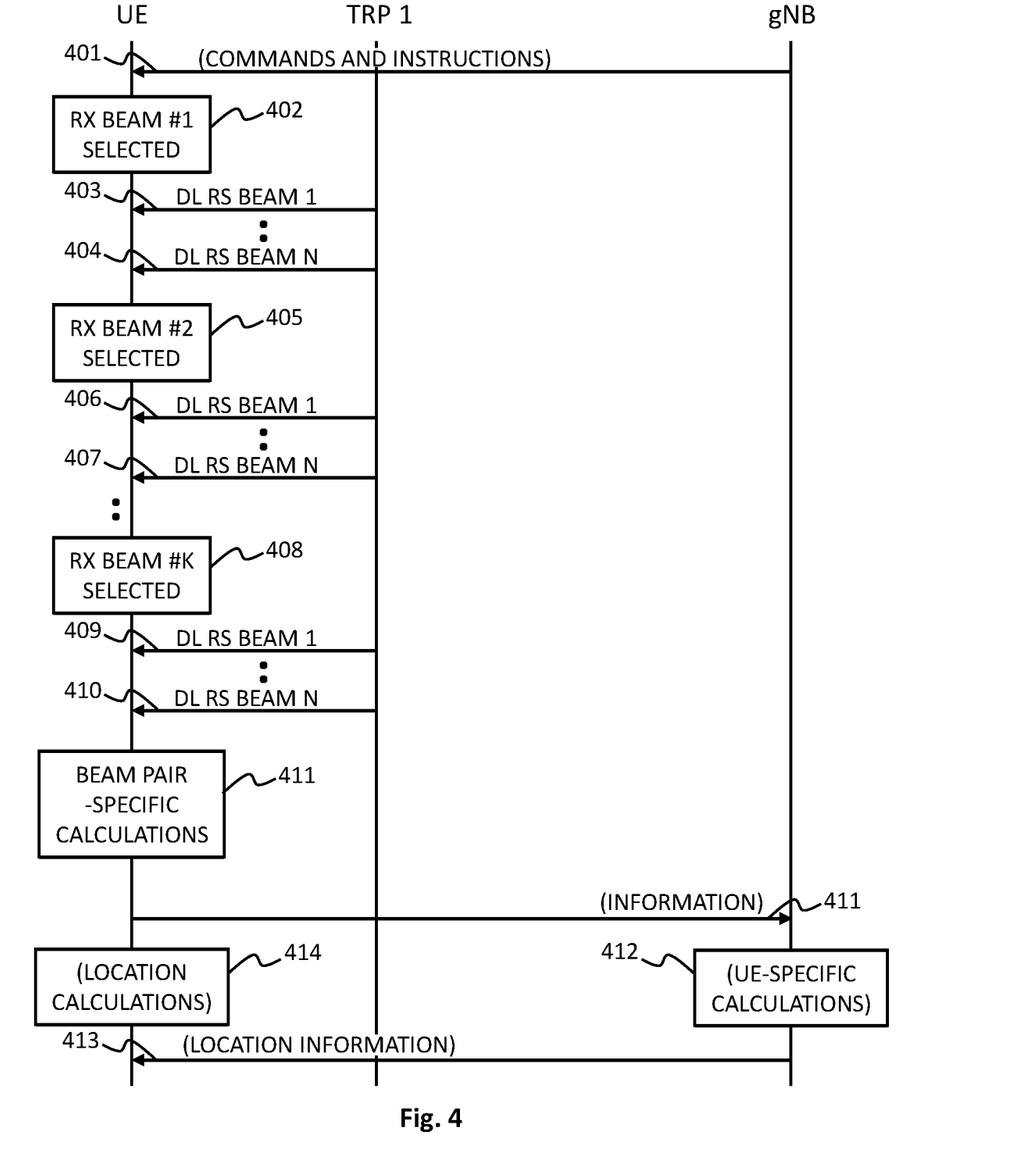
FIG. 4 illustrates actions of certain network nodes and a client device.

FIG. 4 illustrates a situation in which the client device has the ability of setting up and maintaining a plurality of reception beams (compare to beams 131 to 137 of client device 103 in FIG. 1). In other words, the client device is configured to receive the signal containing the reference symbol(s) through a plurality of reception beams. In order to ensure balanced determining of gains specific to the transmission beams of the network nodes, the client device should select only one of its reception beams, so that only the signal(s) received through the selected reception beam is used for the determining of the plurality of weights. In other words, the gains specific to the different transmission beams of the network nodes should all be determined from signals that the client device received through the same reception beam. For example, again referring briefly back to FIG. 1, the client device 103 might select the reception beam 136 as the one through which it receives all beams 121 to 125 from the network node 102 for the purpose of determining the gains.

The optional step 401 of possibly transmitting commands and/or instructions from the wireless network to the client device in FIG. 4 is comparable to step 201 in FIG. 2, although in the embodiment of FIG. 4 it may comprise also transmitting instructions related to the plurality of reception beams in the client device. The sequence of steps from step 402 to step 410 illustrates how the client device receives the signals of the various transmission beams through one reception beam at a time: it selects a first reception beam at step 402 and uses it to receive the transmissions that a network node made through the 1st to Nth transmission beams at steps 403 to 404, and so on. Only one transmitting network node is shown in FIG. 4 to maintain graphical clarity, but there may be a plurality of network nodes, each of them having a plurality of transmission beams. Also, the sequence of steps is only an example, and numerous other arrangements could be used to make the client device perform the reception of all appropriate transmission beams through all appropriate reception beams.

At step 411, the client device performs the calculations that aim at determining the gains specific to the transmission beams that the network nodes used. In the embodiment of FIG. 4, these calculations can be performed separately for each "transmission beam—reception beam" pair. After the beam (or here: beam pair) specific gains and reliabilities have been determined, the client device may apply one of a plurality of possible criteria for selecting that one of the reception beams, the signals received through which will form the basis for actual location calculations. The possible criteria include, but are not limited to:
- selecting the reception beam that yields the largest sum of gains of all received signals,
- selecting the reception beam that yields the highest gain of an individual received signal,
- selecting the reception beam that yields the largest sum of determined reliabilities of determined gains,
- selecting the reception beam that gives the highest reliability of a determined gain of an individual received signal.

Figure 5:
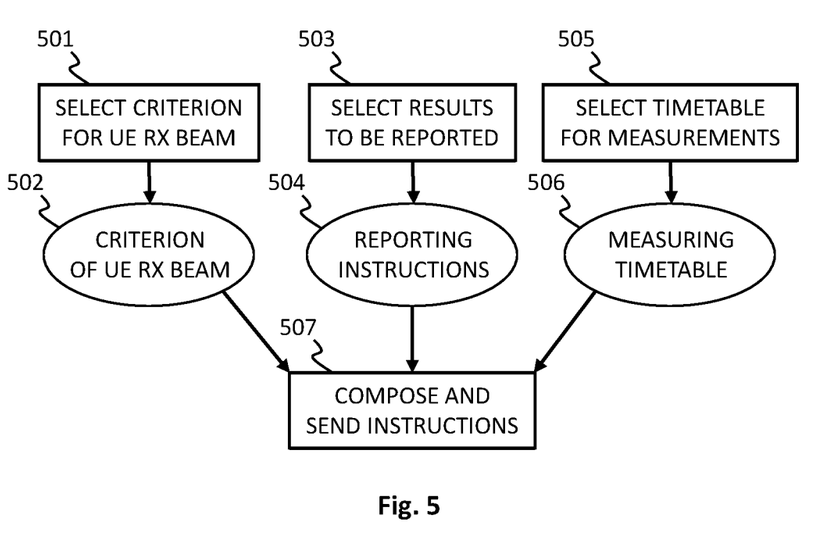
FIG. 5 illustrates a method for a network node.

FIG. 5 illustrates an example of a method that a network device may be configured to execute. The method of FIG. 5 aims at making the network device produce commands and instructions of the kind that were shown earlier in step 201 of FIG. 2 and step 401 of FIG. 4.

At step 501, the network device may select a criterion (or a plurality of criteria) 502 that the client device—which here is assumed to have the capability of multiple reception beams—should apply when it selects the reception beam the reception through which will form the basis of determining those gains that will be used for determining the location of the client device. At step 503, the network device may select, what kind of information it wants to receive from the client device; for example, whether it wants the client device to transmit a variance of a determined gain or a Fisher information of said determined gain as a reliability value. The result of step 503 are one or more reporting instructions 504. At step 505, the network device may determine a timetable 506 that the client device should apply in making the measurements. Step 507 represents formulating the results 502, 504, and 506 into one or command transmissions and transmitting them to the client device.

Figure 6:
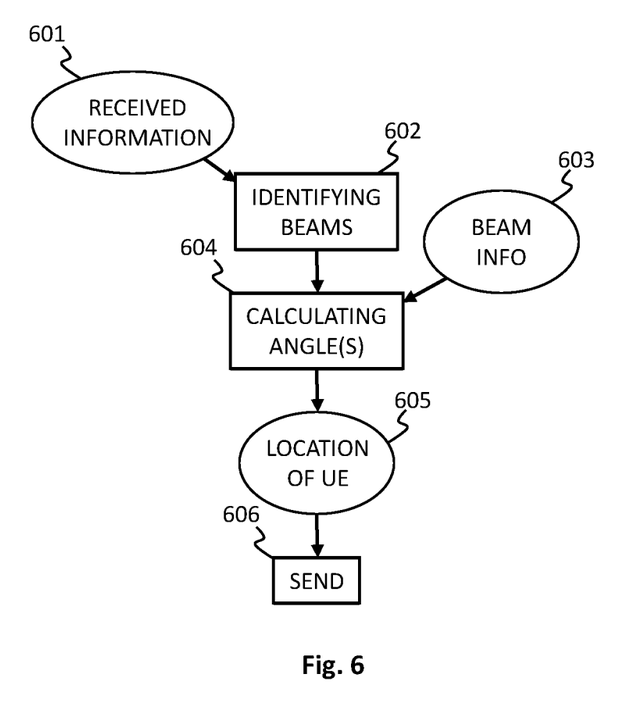
FIG. 6 illustrates a method for a network node.

FIG. 6 illustrates an example of a method that a network device may be configured to execute. The method of FIG. 6 is pertinent to those embodiments of the invention in which the network device performs the actual location calculations to determine the location of the client device.

As shown in 601, the network device is configured to receive from a client device information indicative of gains, wherein a gain indicates a signal strength at which the client device was able to receive a respective signal. As also represented by 601, the network device is configured to receive from the client device reliability values, wherein a reliability value indicates how reliably the client device was able to determine a respective gain. Step 602 illustrates associating the received gains and reliability values with the appropriate transmission beams.

As shown in 603, the network device has also at its disposal information about locations of network nodes that transmitted signals to the client device, and information about directions to which said network nodes transmitted said signals. As shown by step 604, the network device is configured to determine the location of the client device by using information about the locations of the network nodes, information about the directions of the beams, information indicative of the gains that it received from the client device, and the reliability values that it received from the client device.

The result of the calculations at step 604 is the location 605 of the client device. Step 606 shows that the network device may be configured to transmit that information to other devices, like to the client device for example, to other nodes of the wireless network, or even to some devices in other networks that are eligible to receiving location information of the client device. An example of devices of the last-mentioned kind are for example servers of commercial operators to which the user of the client device has given permission to send commercial information pertinent to the actual location of the user.

Figure 7:
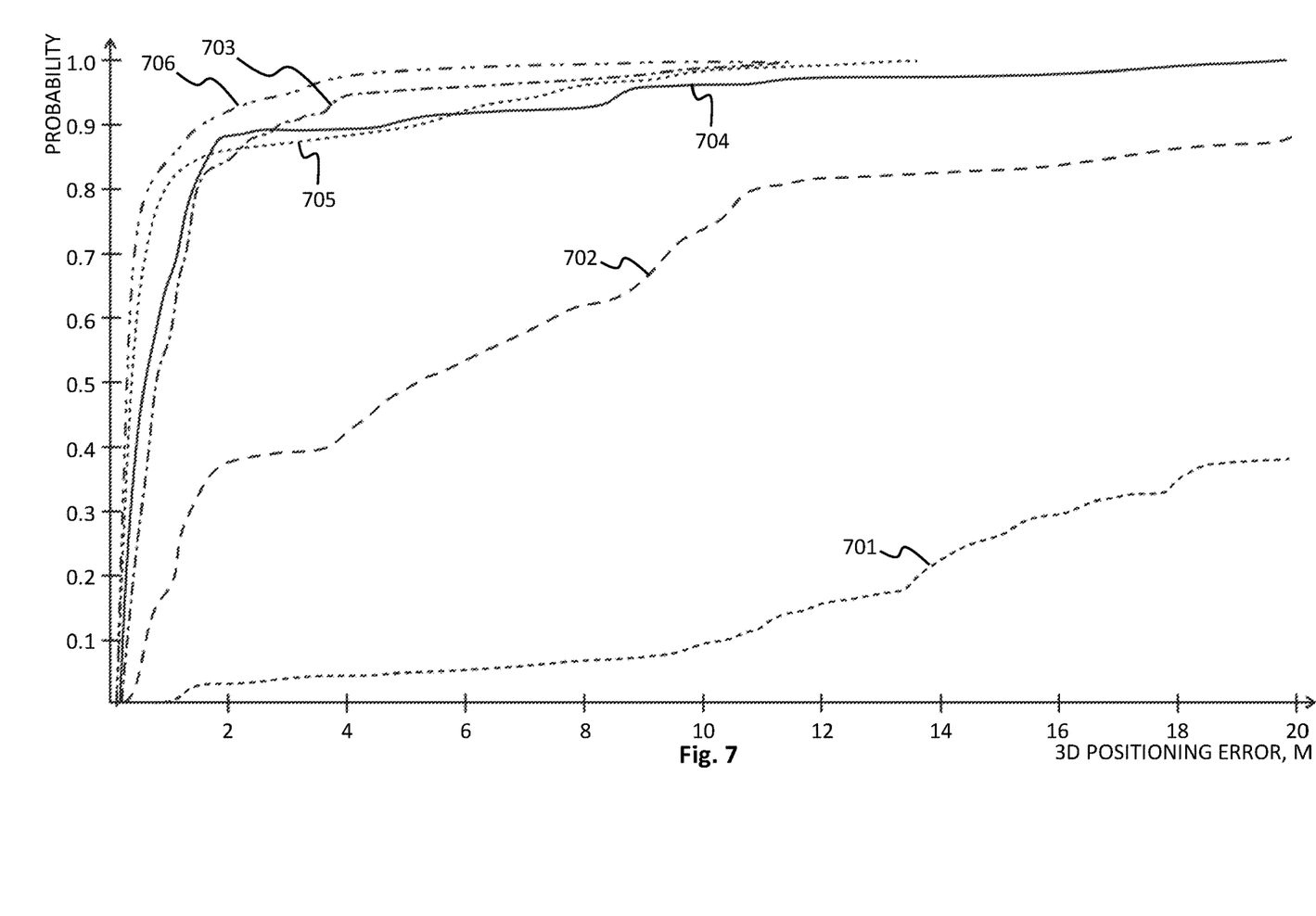
FIG. 7 illustrates an example where the use of weighted combination of subcarriers in determining beam-specific gain improves the accuracy of determining the location of a client devices.

FIG. 7 shows an example of how effectively the use of weighted combination of subcarriers in determining beam-specific gains can improve the accuracy of determining the location of a client device. There are six graphs in the drawing, of which
- graph 701 illustrates the use of 8 beams and equal-weight combination of subcarriers,
- graph 702 illustrates the use of 32 beams and equal-weight combination of subcarriers,
- graph 703 illustrates the use of 64 beams and equal-weight combination of subcarriers,
- graph 704 illustrates the use of 8 beams and weighted combination of subcarriers,
- graph 705 illustrates the use of 32 beams and weighted combination of subcarriers, and
- graph 706 illustrates the use of 64 beams and weighted combination of subcarriers.

The horizontal axis in FIG. 7 illustrates the radius of an imaginary sphere centered at the actual location of the client device, and the vertical axis illustrates the probability of the determined location falling within that sphere.

The processors of either a client device or a network node are programmable circuits. They operate by executing a computer program that consists of one or more sets of one or more machine-readable instructions. Such machine-readable instructions can be stored on a tangible memory medium that is a part of or provided within the reach of the corresponding processor. Computer program embodiments of the kind explained above and referred to the appended claims are such sets of machine-readable instructions that are stored on such tangible memory media.

The invention has been described in conjunction with various embodiments herein. However, other variations to the disclosed embodiments can be understood and effected by those skilled in the art in practicing the claimed invention, from a study of the drawings, the disclosure, and the appended claims. In the description and claims the word "comprising" does not exclude other elements and steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunications system.

Although the invention and its advantages have been described in detail, it should be understood that various changes, substitutions and alterations can be made herein without departing from the spirit and scope of the invention as defined in the appended claims.

Although the invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, combinations, or equivalents that fall within the scope of the present invention.

The invention claimed is:

1. A client device for a wireless network, configured to:
receive a signal that contains a reference symbol modulated onto a plurality of subcarriers,
determine a plurality of weights based on the reference symbol and line-of-sight channel frequency responses for the subcarriers, wherein each of the plurality of weights is associated with one of the plurality of subcarriers,
determine a gain associated with the received signal using the plurality of weights,
determine a reliability value indicative of a reliability of the determined gain,
transmit information indicative of the determined gain and the reliability value to a network node of the wireless network, and
use the determined gain in the client device to determine a location of the client device,
wherein the determined gain is a weighted combination of received subcarriers, and the client device calculates weights used to produce the weighted combination from estimated, subcarrier specific frequency responses of a channel through which the signal is received,
wherein the reliability value indicates how reliably the client device was able to determine a respective gain of the signal strength at which the client was able receive the respective signal, and
wherein the network node uses the reliability value to determine a location of the client device.

2. The client device according to claim 1, configured to:
determine the gain as a real part of a weighted sum of complex vectors, each of the complex vectors representing a corresponding part of the received signal on a corresponding one of the plurality of subcarriers.

3. The client device according to claim 1, configured to:
determine a reliability of the determined gain, and
transmit information indicative of the determined gain to the network node only if the determined reliability is better than a predetermined threshold.

4. The client device according to claim 1, wherein the reliability value comprises at least one of: a variance of the determined gain, a Fisher information of the determined gain.

5. The client device according to claim 1, configured to:
receive the signal through a plurality of reception beams, and
select one of the plurality of reception beams, so that only the signal received through the selected reception beam is used for the determining of the plurality of weights.

6. The client device according to claim 3, configured to:
determine a first Bayesian information criterion indicative of a likelihood of the received signal containing signal and noise, and
determine a second Bayesian information criterion indicative of a likelihood of the received signal containing only noise,
wherein the determined reliability being better than the predetermined threshold indicates that the first Bayesian information criterion is smaller than the second Bayesian information criterion.

7. The client device according to claim 5, configured to perform the selecting of one of the plurality of reception beams by applying one of the following criteria:
selecting the reception beam that yields the largest sum of gains of all received signals,
selecting the reception beam that yields the highest gain of an individual received signal,
selecting the reception beam that yields the largest sum of determined reliabilities of determined gains, and
selecting the reception beam that gives the highest reliability of a determined gain of an individual received signal.

8. A network device for a wireless network, configured to:
receive from a client device information indicative of gains, wherein a gain indicates a signal strength at which the client device was able to receive a respective signal, wherein the client device receives the signal that contains a reference symbol modulated onto a plurality of subcarriers,
receive from the client device reliability values, wherein a reliability value indicates how reliably the client device was able to determine a respective gain of the signal strength at which the client was able receive the respective signal, and
determine a location of the client device by using information about:
locations of network nodes that transmitted signals to the client device,
directions to which the network nodes transmitted the signals,
the information indicative of the gains, and
the reliability values,
wherein the determined gain is a weighted combination of received subcarriers, and the client device calculates weights used to produce the weighted combination from estimated, subcarrier specific frequency responses of a channel through which the signal is received.

9. The network device according to claim 8, wherein the network device is configured to transmit to the client device instructions of determining reliability of gains that the client device determines for the signals it receives.

10. A method for a client device in a wireless network, comprising:
receiving a signal that contains a reference symbol modulated onto a plurality of subcarriers,
determining a plurality of weights based on the reference symbol and line-of-sight channel frequency responses for the subcarriers, wherein each of the plurality of weights is associated with one of the plurality of subcarriers,
determining a gain associated with the received signal using the plurality of weights,
determining a reliability value indicative of a reliability of the determined gain,
transmitting information indicative of the determined gain and the reliability value to a network node of the wireless network, and
using the determined gain in the client device to determine a location of the client device,
wherein the determined gain is a weighted combination of received subcarriers, and the client device calculates weights used to produce the weighted combination from estimated, subcarrier specific frequency responses of a channel through which the signal is received, wherein the reliability value indicates how reliably the client device was able to determine a respective gain of the signal strength at which the client was able receive the respective signal, and wherein the network node uses the reliability value to determine a location of the client device.

\* \* \* \* \*